United States Patent
Lin

(10) Patent No.: US 8,335,412 B2
(45) Date of Patent: Dec. 18, 2012

(54) OPTICAL FIBER COUPLER

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 228 days.

(21) Appl. No.: 12/859,273

(22) Filed: Aug. 19, 2010

(65) Prior Publication Data

US 2011/0286697 A1 Nov. 24, 2011

(30) Foreign Application Priority Data

May 19, 2010 (CN) .......................... 2010 1 0175545

(51) Int. Cl.
G02B 6/32 (2006.01)

(52) U.S. Cl. .......................................... 385/33; 385/35

(58) Field of Classification Search .................. None
See application file for complete search history.

(56) References Cited

U.S. PATENT DOCUMENTS

| | | | |
|---|---|---|---|
| 4,421,383 A * | 12/1983 | Carlsen | 385/79 |
| 6,438,290 B1 * | 8/2002 | Bietry et al. | 385/33 |
| 7,068,883 B2 * | 6/2006 | Ludington et al. | 385/33 |
| 2003/0081897 A1 * | 5/2003 | Itoh et al. | 385/34 |
| 2004/0062478 A1 * | 4/2004 | Ludington et al. | 385/33 |
| 2011/0026885 A1 * | 2/2011 | Lin | 385/77 |
| 2011/0286697 A1 * | 11/2011 | Lin | 385/33 |
| 2012/0014645 A1 * | 1/2012 | Kadar-Kallen | 385/33 |
| 2012/0020618 A1 * | 1/2012 | Erdman et al. | 385/33 |
| 2012/0020619 A1 * | 1/2012 | Kadar-Kallen et al. | 385/33 |

* cited by examiner

Primary Examiner — Rhonda Peace
(74) Attorney, Agent, or Firm — Altis Law Group, Inc.

(57) ABSTRACT

An optical fiber coupler includes a receiving interface and two lenses. The receiving interface is configured for matching and connecting to an external optical fiber of a particular diameter within a range of 62.5 μm to 100 μm, and for receiving optical signals from the external optical fiber. The two lenses are configured for coupling the received optical signals. A distance between the two lenses falls within a range from 0.5 mm to 0.95 mm. A curvature radius of each of the two lenses falls within a range from 0.3579 mm to 0.3898 mm.

5 Claims, 4 Drawing Sheets

| L mm | R (UL) mm | R (LL) mm | Rate / (UL) | Rate / (LL) | IL (UL) dB | IL (LL) dB |
|---|---|---|---|---|---|---|
| 0.5 | 0.3898 | 0.3589 | 1.2827 | 1.393 | -2.000 | -2.006 |
| 0.68 | 0.3895 | 0.3584 | 1.7458 | 1.897 | -2.000 | -2.000 |
| 0.781 | 0.3893 | 0.3583 | 2.0061 | 2.180 | -2.006 | -2.002 |
| 0.882 | 0.3887 | 0.3579 | 2.2691 | 2.464 | -2.014 | -2.005 |
| 0.95 | 0.3885 | 0.3579 | 2.4453 | 2.655 | -2.002 | -2.005 |

FIG. 2

OPTICAL FIBER COUPLER

BACKGROUND

1. Technical Field

The present disclosure relates to optical fibers and, particularly, to an optical fiber coupler.

2. Description of Related Art

In general, segments of fiber cables are joined by couplers which transmit optical signals between the segments. Although conventional optical fiber couplers satisfy basic requirements, novel optical fiber couplers which can further reduce insertion loss are desirable in the field.

BRIEF DESCRIPTION OF THE DRAWINGS

FIG. 2 is a table showing relationships among distances between two lenses, curvature radii of the two lenses, and insertion losses of the optical fiber coupler of FIG. 1.

DETAILED DESCRIPTION

Figure 1:
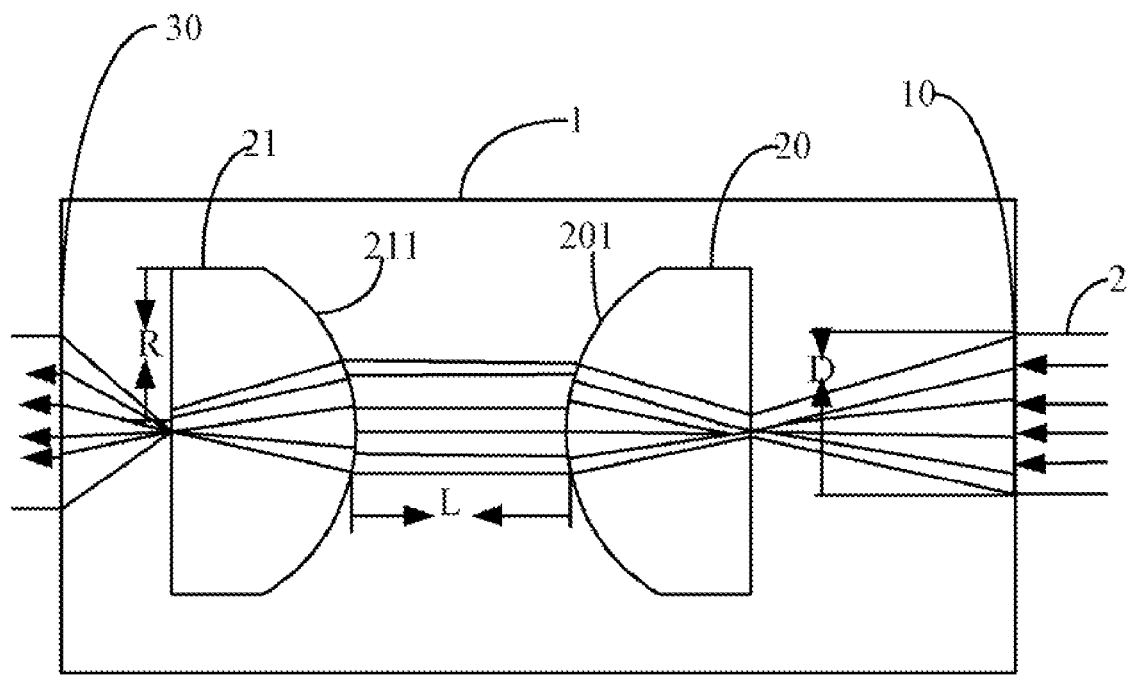
FIG. 1 is a schematic view of an optical fiber coupler in accordance with an exemplary embodiment.

Referring to FIG. 1, an optical fiber coupler 1 includes a receiving interface 10, two lenses 20, 21, and a connection interface 30. The receiving interface 10 is configured for matching and connecting to an external optical fiber 2 of a diameter from 62.5 μm to 100 μm, and is configured for receiving optical signals from the external optical fiber 2 for transmitting the signals to the two lenses 20, 21. The two lenses 20, 21 are configured for coupling the transmitted optical signals, and transmitting the coupled optical signals to the connection interface 30. The connection interface 30 is configured for matching and connecting to another external optical fiber, and configured for receiving the optical signals from the lenses 20, 21. In the embodiment, the two lenses 20, 21 are plano-convex aspherical lenses and include convex surfaces 201, 211 correspondingly. The convex surfaces 201, 211 of the lenses 20, 21 are opposite to each other.

Referring also to FIG. 2, a table shows the relationships among insertion losses, distances between the lenses 20, 21, and the curvature radii of the lenses 20, 21, when the diameter of the optical fiber 2 falls within a range from 62.5 μm to 100 μm. D is the diameter of the receiving interface 10; L is the distance between two lenses 20, 21. In the table, R (UL) is the larger curvature radius between two lenses 20, 21; R (LL) is the smaller curvature radius between two lenses 20, 21; Rate (UL) is the ratio value of D divided by R (UL); Rate (LL) is the ratio value of D divided by R (LL), IL (UL) is the maximum insertion loss and IL (LL) is the minimum insertion loss. The insertion loss used herein is a power loss of signals caused by the insertion of a device in the transmission path of the signals. In the embodiment, the insertion loss is the result of insertion of the optical fiber 1.

As shown in FIG. 2, when the distance L is 0.5 mm and the curvature radius R (UL) is 0.3898 mm, the ratio value Rate (UL) is 1.2828 and the insertion loss IL (UL) is −2.000 dB. When the distance L is 0.5 mm and the curvature radius R (LL) is 0.3589 mm, the ratio value Rate (LL) is 1.393 and the insertion loss IL (LL) is −2.006 dB; when the distance L is 0.95 mm and the curvature radius R (UL) is 0.3885 mm, the ratio value Rate (UL) is 2.4453 and the insertion loss IL (UL) is −2.002 dB; when the distance L is 0.95 mm and the curvature radius R (LL) is 0.3579 mm, the ratio value Rate (LL) is 2.655 and the insertion loss IL (LL) is −2.005 dB. From the above data, it is apparent that when the diameter of the receiving interface 10 D falls within the range from 62.5 μm to 100 μm, the distance L falls within the range from 0.5 mm to 0.95 mm, and the curvature radius R (UL) and the curvature radius R (LL) fall within the range from 0.3579 mm to 0.3898 mm, the insertion loss IL (UL) and the insertion loss IL (LL) are always below −2.000 dB.

Figure 3:
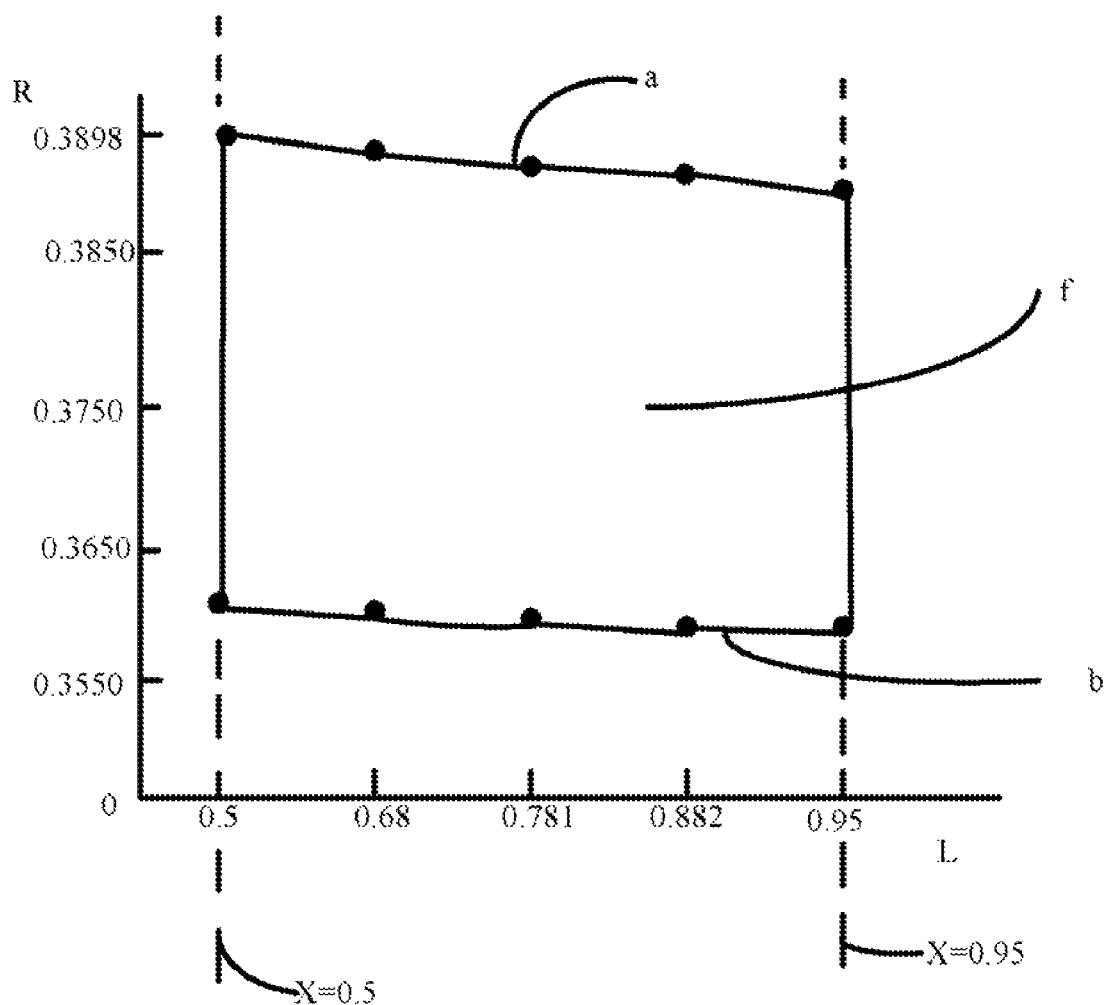
FIG. 3 shows a relationship between the distance between two lenses and the curvature radii of the lens, in this situation the insertion loss of FIG. 2 always below −2.000 dB.

In the graph shown in FIG. 3, the horizontal axis represents the distance L, and the vertical axis represents the curvature radius R (UL) and R (LL). As the distance L changes gradually from 0.5 mm to 0.95 mm and the curvature radius R (UL) changes gradually from 0.3885 mm to 0.3898 mm, the insertion loss IL (UL) is always below −2.000 dB. When the distance L changes gradually from 0.5 mm to 0.95 mm, and the curvature radius R (LL) changes gradually from 0.3579 mm to 0.3589 mm, the insertion loss IL (LL) is always below −2.000 dB, as shown in graph b. It is apparent that when the diameter of the receiving interface 10 D falls within the range from 62.5 μm to 100 μm, and the distance L, the curvature radius R (UL) and R (LL) fall within an area f which formed by graph a, graph b, X=0.5, and X=0.95, the insertion losses IL (UL) and IL (LL) are always below −2.000 dB.

Figure 4:
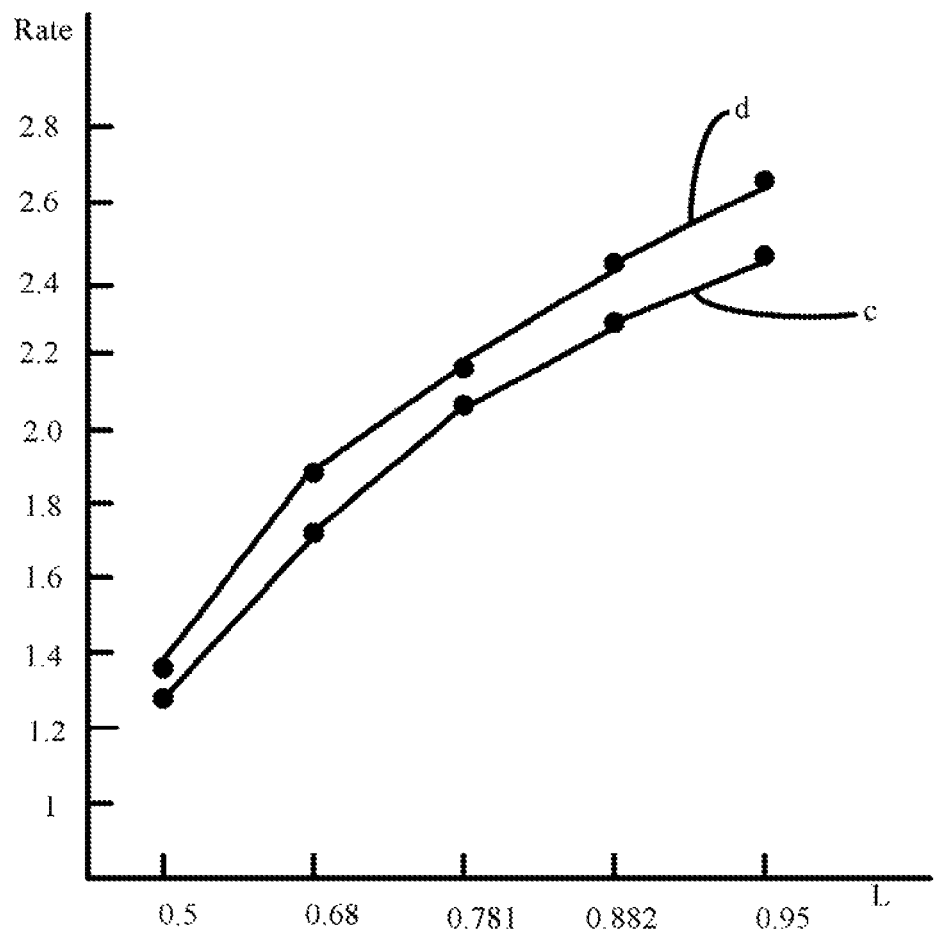
FIG. 4 shows a relationship between the distance between two lenses and a ratio value of the distance dividing the curvature radius of the lens, in this situation the insertion loss always below −2.000 dB.

In the graph shown in FIG. 4, the insertion losses IL (UL) and IL (LL) are always below −2.000 dB, the horizontal axis represents the distance L; the vertical axis represents the radio value Rate (UL) and Rate (LL). When the distance L changes gradually from 0.5 mm to 0.95 mm, the radio value Rate (UL) changes gradually from 1.2827 to 2.4453, as shown in graph c. That is, the radio value Rate (UL) gradually increases following an increasing of the distance L. When the distance L changes gradually from 0.5 mm to 0.95 mm, the radio value Rate (LL) changes gradually from 1.393 to 2.655, as shown in the graph. That is, the radio value Rate (LL) gradually increases following an increasing of the distance L. It is apparent that when the insertion losses IL (UL) and IL (LL) are always below −2.000 dB, and the diameter of the receiving interface 10 D falls within the range from 62.5 nm to 100 nm, the distance L and the radio value Rate (UL), Rate (LL) are in direct proportion, respectively.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An optical fiber coupler comprising:
    a receiving interface configured for matching and connecting to an external optical fiber of a particular diameter within a range of 62.5 μm to 100 μm, and for receiving optical signals from the external optical fiber; and
    two lenses for coupling the received optical signals;
    wherein a distance between the two lenses falls within a range from 0.5 mm to 0.95 mm, and a curvature radius of each of the two lenses falls within a range from 0.3579 mm to 0.3898 mm.

2. The optical fiber coupler as described in claim 1, wherein the two lenses are plano-convex, aspherical lenses.

3. The optical fiber coupler as described in claim 2, wherein the convex surfaces of the two lenses face each other.

4. The optical fiber coupler as described in claim 1, further comprising a connection interface configured for matching and connecting to another optical fiber, and configured for receiving the coupled optical signals from the lenses.

5. The optical fiber coupler as described in claim 4, wherein the two lenses are further configured for transmitting the coupled optical signals to the connection interface.

\* \* \* \* \*